Figure 1:
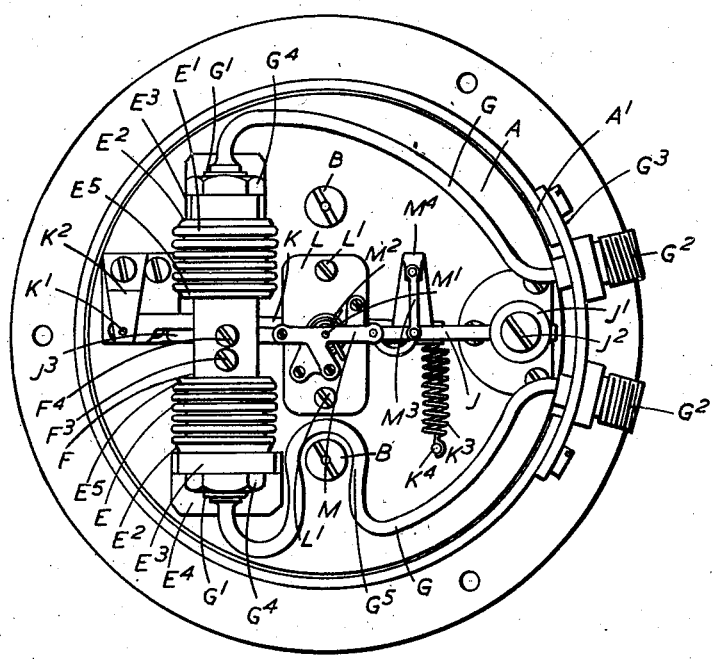

Sept. 9, 1947.  G. C. R. BIRCH  2,427,249
FLUID PRESSURE GAUGE
Filed Sept. 14, 1944  2 Sheets-Sheet 1

George C. R. Birch, Inventor
By Emery Holcombe & Blair
Attorney

Sept. 9, 1947.   G. C. R. BIRCH   2,427,249
FLUID PRESSURE GAUGE
Filed Sept. 14, 1944   2 Sheets-Sheet 2

George C. R. Birch, Inventor
By Emery Holcombe & Blair
Attorney

Patented Sept. 9, 1947

2,427,249

UNITED STATES PATENT OFFICE 2,427,249

FLUID PRESSURE GAUGE

George Christian Ross Birch, Raynes Park, England, assignor to B. & R. Patents Limited, London, England, a company of Great Britain Application September 14, 1944, Serial No. 554,106
In Great Britain June 5, 1944

18 Claims. (Cl. 73—407)

This invention relates to differential fluid pressure gauges of the kind comprising two pressure responsive elements, such for example as expansible bellows, each comprising an abutment mounted on a base and a part movable relatively to said abutment under the applied fluid pressure, the two pressure responsive elements being simultaneously subject to two pressures respectively the difference between which is indicated on the gauge by suitable indicating means.

The invention has for its object to provide an improved construction of such gauge which, while capable of withstanding high fluid pressures, will permit the use of relatively light pressure responsive elements and indicating mechanism so as to ensure accurate and sensitive response and indication throughout the range of measurement of the gauge.

In a fluid pressure gauge according to the invention, the movable parts of the pressure responsive elements are loaded by a spring finger or rod anchored to the base, the indicating mechanism being actuated in accordance with the degree of flexure of the spring rod in one direction or the other.

Preferably the movable parts of the two pressure responsive elements are connected together and to the free end portion of the spring rod by a single coupling device extending transversely to the length of the spring rod. Means are conveniently provided for adjusting at least one of the pressure responsive elements so as to vary its initial stiffness or rate. For example, the coupling device may be longitudinally adjustable so as to vary the initial tension or rate of both the pressure responsive elements. In a preferred construction the pressure responsive elements are constituted by two expansible bellows arranged with their longitudinal axis substantially in alignment, and means are provided for adjusting the abutment surface between at least one of the abutments and the corresponding bellows in a direction transverse to the said axis.

The indicating mechanism may be operated by a lever pivoted on the base and actuated, preferably adjacent to its pivot, by a part moving with the free end of the spring rod, means being conveniently provided for adjusting the distance between the pivot of the lever and the point of engagement between the lever and the spring rod. For example, the said pivoted lever may be operated by a lug or claw formed integral with the free end of the spring rod, the lever being conveniently biassed by a light spring into engagement with the lug or claw. In order to avoid damage to the gauge due to overload, each pressure responsive element may be furnished with a stop which automatically limits the range of actuation of the element.

Figure 2:
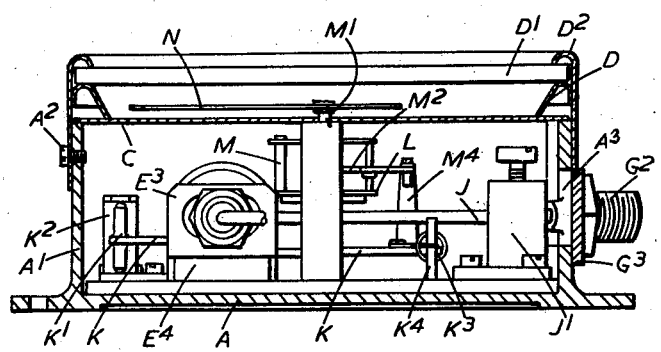
Figure 3:
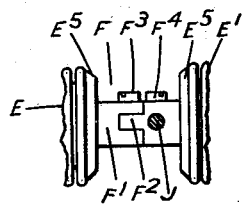
Figure 4:
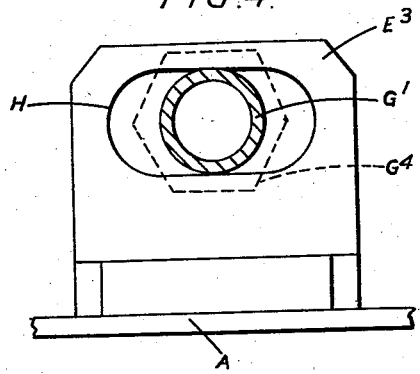
Figure 5:
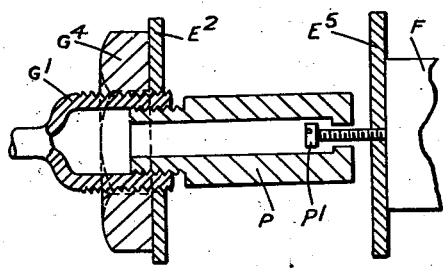

The invention may be carried into practice in various ways but one construction according to the invention is shown by way of example in the accompanying drawings, in which Figure 1 is a plan of the gauge with the cover plate, dial and pointer removed, Figure 2 is a vertical section with the cover plate, dial and pointer in position, Figure 3 illustrates the adjustable coupling between the two bellows, Figure 4 shows the end piece of one bellows in end elevation and with the associated nut removed, and Figure 5 is a longitudinal section through one of the bellows but with the envelope omitted.

In the construction shown in the drawings the gauge comprises a flat metal base A having an upstanding cylindrical flange $A^1$ formed integral therewith and constituting the main casing of the gauge. Extending upwards from the base within the casing are two vertical pillars B each having a threaded aperture in its upper end for receiving a grub screw whereby a dial C, suitably graduated, is secured in position so as to lie upon the annular upper edge of the cylindrical casing $A^1$. A metal bezel D lies on the upper surface of the dial C and the usual protective glass $D^1$ is presented down on to the bezel D by a cylindrical metal cap $D^2$ secured to the cylindrical wall $A^1$ of the casing by screws $A^2$.

Arranged within the cylindrical casing $A^1$ are two pressure responsive elements which may be as shown each in the form of an expansible spring bellows E, $E^1$ and comprising a fixed part or abutment $E^2$ cooperating with a bracket whose upwardly extending part $E^3$ has an opening coaxial with the bellows whilst its lower part or foot $E^4$ is secured to the base A of the casing. The two bellows E, $E^1$ are opposed, that is to say they lie with their axes substantially in alignment, and the adjacent or free ends $E^5$ of the bellows, which constitute the movable parts thereof, are secured together by a longitudinally adjustable coupling device F comprising a bifurcated plug $F^1$ carried by the movable part of one bellows and a tongue or dog $F^2$ carried by the movable part of the other bellows and making a sliding fit into the slot of the said plug $F^1$. The bifurcated plug $F^1$ carries a set screw $F^3$ whereby the dog $F^2$ and bifurcated plug $F^1$ can be locked in the desired position of relative adjustment. In this way, the effective length of the coupling device F, and therefore the initial tension or "rate" of the two bellows E, E¹ can be set as required.

The fixed end E² of each bellows is closed by an end piece furnished with a screwthreaded nipple G¹ which extends through the opening in the upwardly directed part E³ of the associated bracket, a flanged nut G⁴ being screwed to the nipple G¹, on that side of the bracket remote from the bellows, for securing in position the adjacent end of a capillary tube G through which the fluid pressure is applied to the interior of the corresponding bellows. The two capillary tubes G lead to two screwthreaded pipe connectors G² carried by an arcuate plate G³ secured to the outer surface of the cylindrical casing A¹ which has a suitable slot or opening A³ in its wall to accommodate the two pipes G extending therethrough.

The opening H in the upwardly directed part E³ of one (or of each) of the brackets is elongated as shown in Figure 4 or is enlarged relatively to the diameter of the nipple G¹ extending therethrough, so that by easing the associated flanged nut G⁴ the end piece E² of the bellows can be adjusted about the axis of the set screw F³ thus slightly altering the volume of the bellows E and thereby affording a fine initial adjustment to compensate for any difference between the effective fluid pressure areas of the two bellows. To facilitate this adjustment of the abutment surface between the fixed abutment, constituted by the bracket E³, and the cooperating bellows, the corresponding capillary tube G may be furnished with a curl or loop G⁵ which will afford the resilience necessary to permit the slight translational adjustment of the associated end piece of the bellows.

Extending, at one end, through an aperture in a vertical pillar J¹ carried by the base A between the capillary tubes G where these extend through the opening A² in the wall A¹ of the cylindrical casing, is a spring rod J whose other or free end extends transversely through the part of the coupling device F having the tongue F² and carrying a set screw F⁴ whereby the spring rod J can be securely locked to the said coupling device. A similar set screw J² locks the fixed end of the rod J in the aperture of the anchorage pillar J¹. That end of the spring rod J which projects from the side of the coupling device F remote from the anchorage of the rod is bent downwardly to constitute a lug or claw J³ which lies to one side of a lever K pivoted at K¹ on a bracket K² carried by the base A, the lever K extending from the pivot K¹ and beneath the coupling device F back to a point adjacent to the anchorage pillar J¹ of the spring rod J. A light spring K³ anchored at one end to the base at K⁴ is connected at its other end to the pivoted lever K so that this is lightly biassed into engagement with the claw J³ at the free end of the spring rod J. The claw J³ thus engages the pivoted lever K near the pivot or fulcrum K¹ thereof so that any movement of the free end of the spring rod J, that is to say movement of the coupling device F due to expansion of one bellows relatively to the other with consequent corresponding flexure of the spring rod J, will be represented by a somewhat magnified movement at the end of the pivoted lever K.

By releasing the set screw J² on the anchoring pillar J¹ the spring rod J can be longitudinally adjusted so as to increase or decrease the distance between the pivot K¹ of the lever K and the point where the claw J³ of the spring rod J engages the lever K, thus decreasing or increasing said magnification.

Mounted on a plate L supported by two subsidiary pillars L¹ disposed between the pillars B carrying the dial C, is a movement frame M which carries the indicating mechanism comprising a central rotary shaft M¹ furnished with a toothed drum which is engaged by a toothed quadrant M² pivotally mounted on the movement frame M and operated, through a light link M³, by a U-shaped bracket M⁴ carried by the end of the pivoted lever K which lies beneath and extends beyond the movement plate L.

In operation the two pipe connections G are coupled to the two fluid pressure sources whose difference is to be gauged, the initial tension of the two bellows E, E¹ having been set as desired by means of the coupling device F, whilst such relative compensation as may be required is effected by transverse translational adjustment of one fixed abutment surface E² as above described. As the pressure applied to one bellows increases relatively to that applied to the other bellows the spring loading rod J will be correspondingly flexed so that the pivoted lever K will be turned about its pivot K¹ either by the direct action of the claw J³ on the spring rod J or by the biassing spring K³ according to the direction of flexure of the loading spring J. The resultant angular movement of the lever K will turn the toothed quadrant M² and thus rotate the central rotary shaft M¹ which extends freely through a central aperture in the dial C and is secured to a pointer N lying above the upper surface of the dial C.

It will be appreciated that since movement of the coupling device F from a central or static position can only take place against the pressure of the spring loading rod J, which is preferably made from a length of steel rod and affords a high rate of increase in the loading for a small movement of the coupling device F, the inherent resistance of the pressure responsive elements E, E¹ need not exceed that necessary for light fluid pressure loads even though the gauge is capable of dealing with high fluid pressures on either pressure responsive element. Thus, a high fluid pressure rating is obtained for the gauge whilst permitting the use of light pressure responsive elements and indicating mechanism associated therewith so as to ensure accurate and sensitive response and indication throughout the range of measurement of the gauge.

It will be understood that the construction above described is given by way of example only and that details may be modified to suit requirements. For example, in spite of the high rate of increase of the spring loading afforded by the spring rod, it may be preferred to guard against accidental overloading by providing each pressure responsive element with an overload stop which limits the range of movement of the movable part relatively to the fixed part or abutment thereof. As shown in Figure 5, such stop may comprise an internal longitudinally adjustable hollow distance piece P carried by the end piece E² of the bellows and cooperating with a stop P¹ at the other or movable end E⁵ of the bellows to provide a positive limit to the range of expansion of the bellows.

What I claim as my invention and desire to secure by Letters Patent is:

1. A differential fluid pressure gauge comprising a base, two pressure responsive elements each including an abutment mounted on the base and a part movable relatively to the abutment under the applied fluid pressure, means whereby the two pressure responsive elements are simultaneously subject to two pressures respectively, the said movable parts of the pressure responsive elements acting in opposition to each other, a spring rod anchored to said base and resiliently resisting the movement of said movable parts of the pressure-responsive elements resultant from the two pressures, and indicating mechanism actuated in accordance with the flexure of the spring rod in one direction or the other.

2. A differential fluid pressure gauge comprising a base, two opposed pressure responsive elements each having an abutment mounted on the base and a part movable relatively to the abutment under the applied fluid pressure, means whereby the two pressure responsive elements are simultaneously subject to two fluid pressures, the two movable parts acting in opposition to each other, a spring rod anchored to said base and extending between and transversely to the direction of movement of the two movable parts which thus flex the rod in accordance with the difference between the said two fluid pressures, and indicating mechanism actuated in accordance with the flexure of the spring rod in one direction or the other.

3. A differential pressure gauge, as claimed in claim 1, in which the movable parts of the two pressure responsive elements are connected together and to the free end portion of the spring rod by a single coupling device extending transversely to the length of the spring rod.

4. A differential fluid pressure gauge as claimed in claim 2, in which the movable parts of the two pressure responsive elements are connected together and to the free end portion of the spring rod by a single coupling device extending transversely to the length of the spring rod.

5. A differential pressure gauge comprising a base, two expansible and opposed bellows each abutting at one end against a part carried by the base and having its other end movable relatively to the abutment under the applied fluid pressure, means whereby the two expansible bellows are simultaneously subject to two different pressures, the two movable parts of the bellows acting in opposition to each other, a spring rod anchored to said base and extending between and transversely to the direction of movement of the two movable parts which thus flex the rod in accordance with the difference between the two fluid pressures, and indicating mechanism actuated in accordance with the flexure of the spring rod.

6. A differential pressure gauge as claimed in claim 5, in which the movable parts of the two bellows are connected together and to the free end portion of the spring rod by a single coupling device extending transversely to the length of the spring rod.

7. A differential pressure gauge as claimed in claim 5, having means for adjusting at least one of the bellows so as to vary its initial stiffness or rate.

8. A differential pressure gauge as claimed in claim 1, in which the two movable parts of the pressure-responsive elements are connected together and to the free end portion of the spring rod by a single coupling device which is longitudinally adjustable so as to vary the initial tension of both pressure-responsive devices.

9. A differential pressure gauge as claimed in claim 5, in which the movable parts of the two bellows are connected together and to the free end portion of the spring rod by a single coupling device extending transversely to the length of the spring rod, the coupling device being longitudinally adjustable so as to vary the initial tension of both bellows.

10. A differential pressure gauge as claimed in claim 5, in which the two bellows are arranged in axial alignment and means are provided for effecting relative adjustment between at least one of the bellows and its abutment in a direction transverse to the axis of the bellows.

11. A differential pressure gauge as claimed in claim 5, in which the two bellows are arranged in axial alignment, means being provided for effecting relative adjustment between at least one of the bellows and its abutment in a direction transverse to the axes of the bellows, and the movable parts of the two bellows are connected together and to the free end portion of the spring rod by a coupling device extending transversely to the length of the spring rod, the coupling device being longitudinally adjustable so as to vary the initial tension of both bellows.

12. A differential pressure gauge as claimed in claim 1, in which the indicating mechanism is actuated by a lever pivoted on the base and actuated by a part moving with the free end portion of the spring rod.

13. A differential pressure gauge comprising a base, two expansible and axially aligned bellows each abutting at one end against a part carried by the base and having its other end movble relatively to the abutment under the applied fluid pressure, means whereby the two expansible bellows are simultaneously subject to two fluid pressures from different sources, the movable parts of the bellows acting in opposition to each other, a spring rod anchored to said base and extending between and transversely to the direction of movement of the two movable parts which thus flex the rod in accordance with the difference between the two fluid pressures, a lever pivoted on said base, a part moving with the free end portion of the spring rod and acting transversely on the said lever at a point spaced from the fulcrum thereof, and indicating means actuated by the free end portion of said lever.

14. A differential pressure gauge as claimed in claim 1, in which the indicating mechanism is actuated by the free end portion of a lever fulcrumed on the base and acted upon by a part moving with the free end portion of the spring rod, means being provided for adjusting the distance between the fulcrum of said lever and the point of engagement between the lever and the part carried by the spring rod.

15. A differential pressure gauge as claimed in claim 13, in which means are provided for adjusting the distance between the fulcrum of the lever and the point of engagement between the lever and the part moving with the spring rod.

16. A differential pressure gauge as claimed in claim 1, in which each pressure responsive element is furnished with a stop which automatically limits the range of actuation of the element.

17. A differential pressure gauge as claimed in claim 5, in which each bellows is furnished with a stop which automatically limits the range of actuation of the element.

18. A differential pressure gauge comprising a base, two expansible bellows in axial alignment, each bellows acting at its outer end on an abutment carried by the base and having its other end free to move axially relatively to the abutment under the action of the fluid pressure applied to the interior of the bellows, the two movable inner or adjacent ends of the bellows thus acting in opposition to each other, a spring rod anchored at one end to the base and having its free end portion extending between and transversely to the expansible bellows, a coupling device connecting the movable ends of the bellows together and to the free end portion of the spring rod, means for adjusting the effective length of the coupling device, means for adjusting at least one of the bellows relatively to its abutment on the base transversely to the axes of the bellows, a lever fulcrummed at one end on the base, a transverse projection at the free end portion of the spring rod and acting on the lever adjacent to said fulcrum, an indicator operated by the free end portion of the lever, a spring acting on said lever and tending to urge it into engagement with said transverse projection, means for adjusting the distance between the fulcrum of the lever and the point of engagement between the lever and said transverse projection, and two conduits through which fluid pressure from two different sources is applied to the interiors of the two bellows respectively.

GEORGE CHRISTIAN ROSS BIRCH.

REFERENCES CITED

The following references are of record in the file of this patent:

UNITED STATES PATENTS

| Number | Name | Date |
|---|---|---|
| 1,296,947 | Blot-Garnier et al. | Mar. 11, 1919 |
| 1,416,210 | Jung et al. | May 16, 1922 |
| 1,954,425 | Place et al. | Apr. 10, 1934 |
| 2,072,916 | Willach et al. | Mar. 9, 1937 |
| 2,268,469 | Barnhart | Dec. 30, 1941 |